Jan. 3, 1956  A. F. BRIEDE  2,729,419
SHOCK PROOF LOADING VALVE
Filed Sept. 23, 1950  2 Sheets-Sheet 1

INVENTOR.
ARTHUR F. BRIEDE
BY
DES JARDINS, ROBINSON & KEISER

HIS ATTORNEY

Jan. 3, 1956
A. F. BRIEDE
2,729,419
SHOCK PROOF LOADING VALVE
Filed Sept. 23, 1950
2 Sheets-Sheet 2
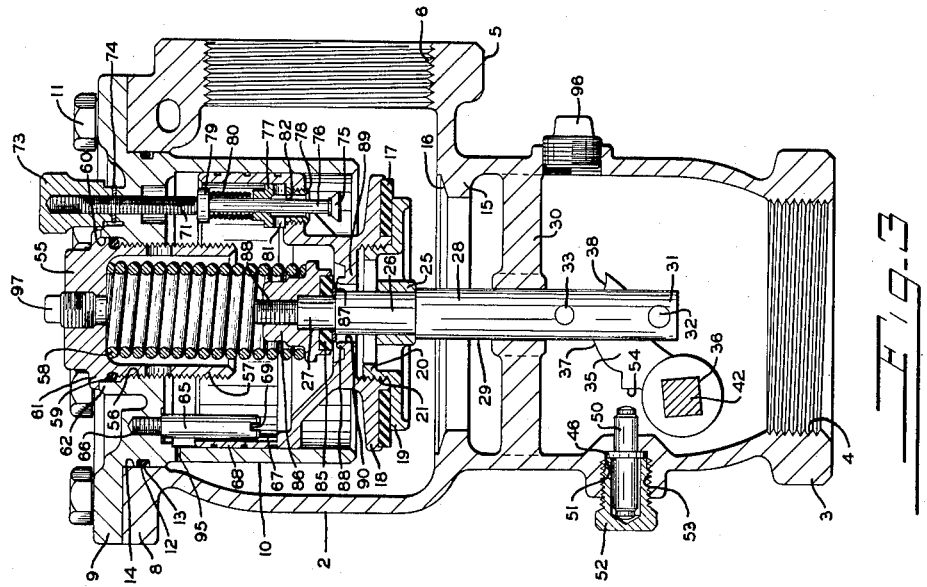
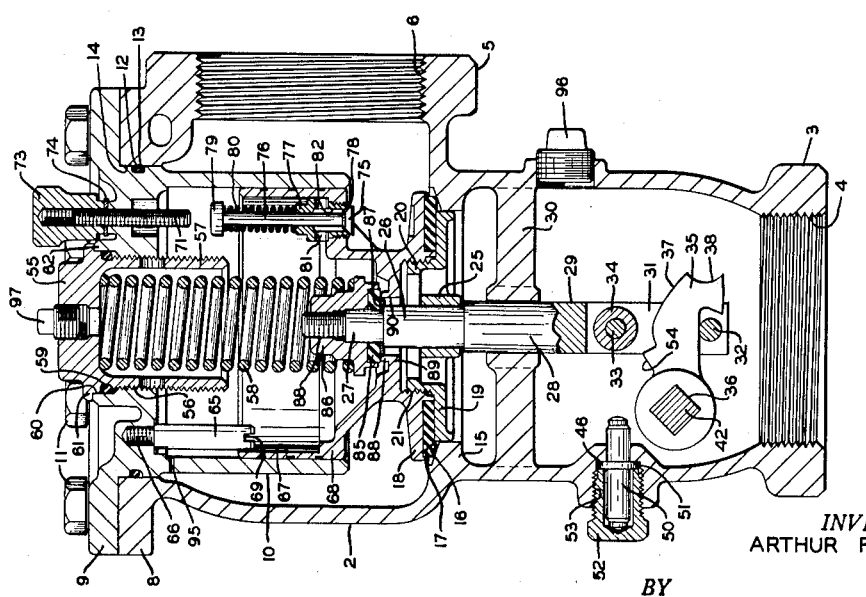
INVENTOR.
ARTHUR F. BRIEDE
BY
DES JARDINS, ROBINSON & KEISER
HIS ATTORNEYS

United States Patent Office 2,729,419
Patented Jan. 3, 1956

2,729,419

SHOCK PROOF LOADING VALVE

Arthur F. Briede, Cincinnati, Ohio, assignor to OPW Corporation, Cincinnati, Ohio, a corporation of Ohio Application September 23, 1950, Serial No. 186,339

2 Claims. (Cl. 251—35)

This invention relates to a shock proof loading valve, and it particularly pertains to loading valves in high pressure fluid supply lines which are quickly closed to nearly closed position and then retarded to slow final closing position to prevent objectionable shock.

In shock proof loading valve constructions heretofore employed, the pressure line has not been advantageously utilized for cooperating with the spring for closing the valve, the dependence for closing the valve being entirely upon the spring. Where the spring is solely relied upon for closing the valve, obviously it needs to be much larger and stronger to be efficient and durable than one which is aided in its function by the pressure line.

Accordingly, the principal object of my invention is in a valve construction which is simple in construction but is positive and efficient in operation.

Another object of the invention is in a valve construction in which the main valve, carrying a pilot valve, is quickly closed to nearly closed position by the joint action of the spring and pressure line and then to final, completely closed position solely by the spring.

Another object of the invention is in a valve construction in which the pressure line behind the valve closing means is automatically turned on and off by the opening and closing of the valve.

Further objects, and objects relating to details of construction and economies of operation, will readily appear from the detailed description to follow. In one instance, I have accomplished the objects of my invention by the device and means set forth in the following specification. My invention is clearly defined and pointed out in the appended claims. A structure constituting a preferred embodiment of my invention is illustrated in the accompanying drawings forming a part of this specification, in which:

Fig. 2 is a cross sectional view on line 2—2 of Fig. 1 looking in the direction of the arrows, showing the valve closed.

Fig. 3 is a cross sectional view, like Fig. 2, showing the valve open.

Figure 1:
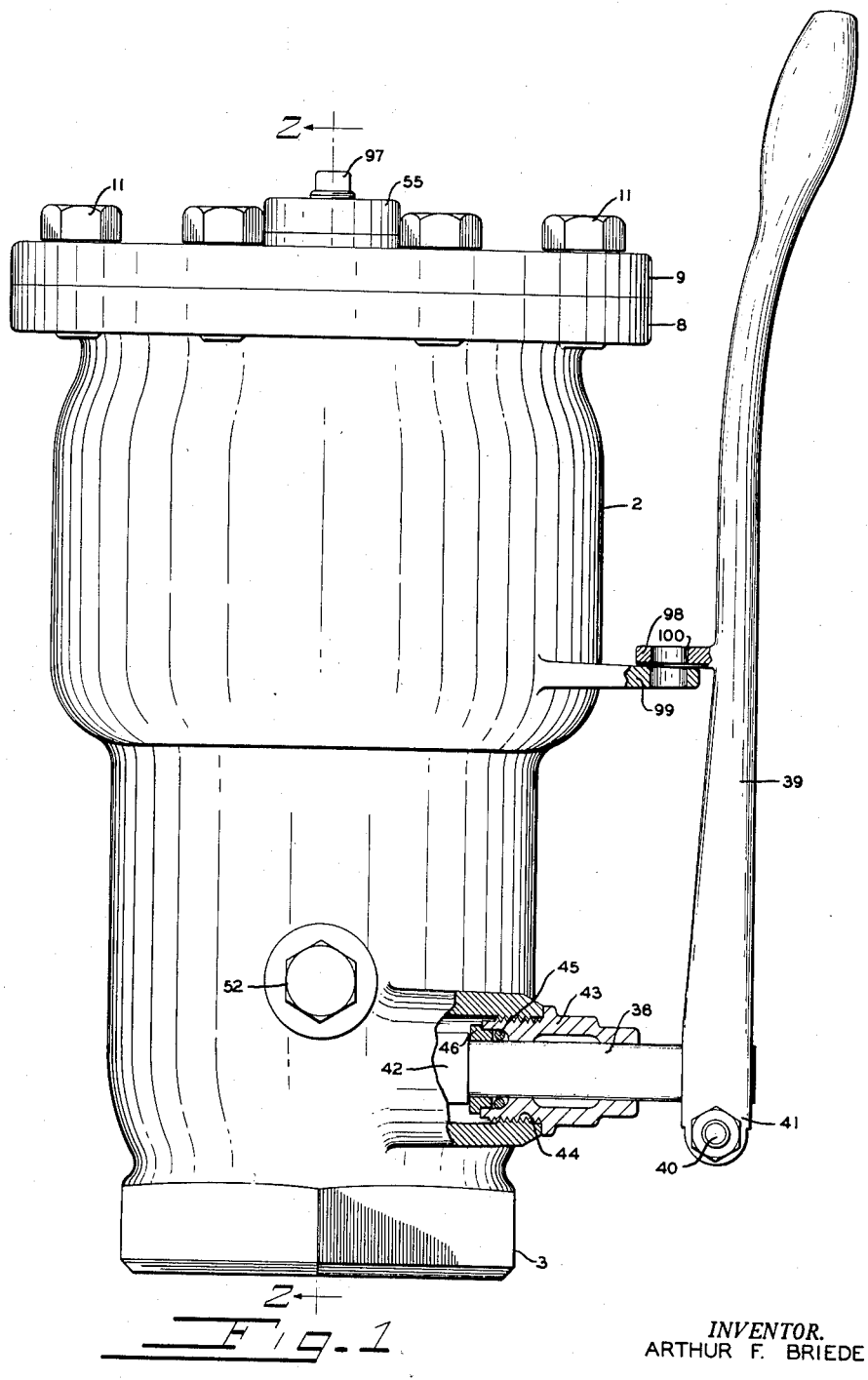
Fig. 1 is a side elevation, opposite the inlet side, of a valve unit embodying my invention.

Referring specifically to the drawings in which like numerals are used to designate like parts, numeral 2 is a valve body or casing having a tap outlet 3 at one end of the casing, screw threaded at 4, and a tap inlet 5 in the side wall near the opposite end of the casing, screw threaded at 6 for being screw-threadedly connected to the ends of pipe sections in a pipe line from a source of supply. The opposite end of the valve body is flanged at 8 for seating a mating flange 9 on a cylinder member 10 that is bolted at 11 to clamp the faces of the flanges 8 and 9 tightly together. A sealing ring 12 is self contained within a groove 13 in the outer wall of the cylinder to abut against the inner wall portion 14 of the valve body. An annular flange 15 is formed on the interior wall of the valve body to provide a seat 16 for a valve disc 17 that is clamped to the end of a disc holder 18 by a skirt 19.

The skirt has a neck portion 20 which is screw threaded at 21 to a socket formed in the end of the disc holder 18. The skirt also has a central hub 25, centrally bored for receiving the reduced portion 26, between steps 27 and 28, of a poppet stem 29. A bridge 30 is also formed on the interior wall of the valve casing below the valve seat for reciprocatively mounting the poppet stem 29. The bottom end of the poppet stem is bifurcated to provide a recess between two prongs 31. A pin 32 is inserted in the prongs of the forked end of the poppet stem and spaced from another pin 33 also mounted in the prongs near the bottom wall of the recess and having a roller 34 journaled thereon.

An arm 35, fixed at one end to a shaft 36, is disposed to have its free end project through the recess of the forked end of the poppet stem between the pins 32 and 33. The top face of the arm has a cam surface 37 that is disposed in position to contact the roller 34 when the shaft 36 is turned counterclockwise to lift the arm. The end of the arm 35 is recessed at 38 in order to seat the roller 34 therein when the arm has been lifted sufficiently for the roller to pass over the cam surface 37 and from there into the recess 38 in the end of the arm. With the roller 34 seated within the recess 38 on the end of the arm, the poppet valve stem will be held in raised position. The shaft 36 is actuated by a handle 39 clamped to its projecting end by a bolt 40 passing between a pair of prongs 41 on the bifurcated end of the handle. The portion 42 on the shaft to which the arm is attached is non-circular in cross section. That end of the shaft which projects through the casing is mounted in a stuffing box 43 screwed into the valve casing and connected thereto by the screw threads 44. The stuffing box carries a seal ring 45 which is held in place by the gland 46.

A stop pin 50 having an annular flange 46 between end portions of unequal lengths is clamped in a socket 51 by a clamp nut 52 screw threadedly connected to the wall of the socket at 53. The projecting end of the stop pin is disposed to abut against a seat portion 54 on the arm 35 to limit its upward movement. When the stop pin 50 is clamped in place with its shorter length end projecting, the arm can be lifted far enough for the roller 34 to seat within the recess 38 in the end of the arm, thereby locking the poppet stem in raised position. However, when the stop pin is clamped in place with its longer end projecting, it will prevent the arm from being lifted far enough for the roller 34 to seat within the recess 38 in the end of the arm, thereby preventing the poppet stem from being locked in raised position.

The cylinder 10 has a member 55 screw threadedly connected at 56 to the wall of a recess formed therein, said member carrying a surrounding wall 57 to form a socket for seating one end of a compression spring 58. A sealing ring 59 is inserted between the member 55 and the wall 60 beneath the overhanging flange 61 on member 55 that seats against the edge of the wall 62 when said member 55 is screwed home.

One end of a cylindrical stud 65 is screw-threadedly connected at 66 to a socket in the cylinder 10 with its opposite end projecting to engage a groove 67 formed in the wall of a piston 68, carried by the disc holder 18, to keep the piston in alignment. The projecting end of the cylindrical stud has a transverse tool receiving recess 69.

A set screw 71 passes through a screw threaded tapped hole in the head of the cylinder 10 with one end projecting toward the piston to be clamped in adjusted position by cap nut 73 screw threaded to its opposite end. A washer 74 surrounds the screw to be clamped between the end of the cap nut 73 and the end of the cylinder.

A check valve 75 having a stem 76 is mounted on a detachable cage 77 carrying a valve seat 78. A head 79 is formed on the valve stem 76 opposite to the valve 75 for seating one end of a spring 80 which surrounds the stem and has its opposite end against the cage 77. The cage has a series of radial openings 81 from a central opening 82.

There is a secondary valve disc 85 clamped to the end of poppet stem 29 between a holder 86 and a guard washer 87. The holder 86 is screw threaded at 88 to the end of the poppet stem and clamps the disc valve 85 and the guard washer 87 between it and the step 27 on the poppet stem. The main disc holder 18 carries a seat 88 for the secondary valve disc 85, the seat being formed on a web 89 which is integral with the holder 18 and which has an opening 90 of greater diameter than the reduced neck of the poppet stem that projects therethrough. A small bleed port 95 is formed in the wall of the cylinder 10 surrounding the piston which is integrally formed with the valve disc holder 18. This bleed port is of such size to determine the retarding action of the vacuum that is created by the piston within the piston chamber when the main valve is closing, and the check valve 75 has already closed.

A conventional pipe plug 96 is screw threaded to the valve casing below the main valve seat on the outlet side of the valve structure and another pipe plug 97 is screw threaded to the spring seating member 55 in the top end of the cylinder opposite to the piston. Any conventional means may also be provided for locking the handle 39 in position when the valve is closed, this comprising mating lugs 98 and 99 on the handle and valve casing with openings 100 which are in registration to receive a suitable lock.

The valve is shown in closed position in Fig. 2 and in open position in Fig. 3. In opening the valve the handle 39 is moved to rotate the shaft 36 counterclockwise and lift the arm 35 to bring the cam surface 37 thereon in contact with the roller 34 and raise the poppet stem 29. The secondary valve disc 85 is first lifted from its seat for first opening the secondary valve, thereby releasing any pressure behind the piston to permit opening of the main disc valve 17. Continued lifting of the poppet valve stem causes the step portion 28 to engage the hub 25 of the skirt 19 and lift the main disc valve 17 from its seat. The spring 58 which normally is compressed to hold both the main and secondary discs closed is, of course, further compressed as the main valve is further lifted. When the main valve is opened to complete or nearly complete position, the head 79 on the check valve 75 will engage the end of the screw 71 and cause the check valve to be lifted from its seat, thereby permitting line pressure through the check valve into the piston chamber of the cylinder back of the piston. After the desired amount of fluid has been drawn and metered through the valve, the handle is released to permit the main valve to be closed both by the line pressure in back of the piston and the spring. They will cooperate to quickly close the main valve to nearly closed position, during which movement the check valve moves out of contact with the end of the screw 71 and is closed to shut off the line pressure to the cylinder chamber in back of the piston. In the downward movement of the piston as the main valve is being closed, a vacuum is built up in back of the piston, thereby creating a retarding effect upon the final closing of the main valve by the spring so that the final movement of the valve to complete closing position will be slowed down. This retarding effect prevents any shock being created, and the construction permits very rapid closing of the valve to nearly closed position and then a slowed movement to final closed position.

I am aware that there may be various changes in details of construction without departing from the spirit of my invention, and, therefore, I claim my invention broadly as indicated by the appended claims.

Having thus described my invention, what I claim as new and useful and desire to secure by United States Letters Patent, is:

1. A loading valve comprising a casing having a valve seat between inlet and outlet openings, a main valve for said valve seat having a piston connected to its non-seating side and having a substantial area of said side directly exposed to the pressure line, a cylinder for the piston detachably connected to the casing and having a bleed opening therein exposed to the inlet pressure, a supplemental valve and seat mounted on the main valve, a check valve for controlling flow between the inlet and the piston cylinder, means urging the check valve normally closed, a stem projecting from the check valve, a poppet stem for the main and supplemental valves having means for first opening the secondary valve and then the main valve, an arm operatively connected to said poppet stem, a stop pin for said arm having end portions of unequal length to be selected for adjustment by turning said stop pin end for end, common spring means for normally closing the main and supplemental valves, and means disposed in the path of the stem of the check valve for opening the check valve when the main valve is open to its extreme position for admitting inlet pressure to the pressure side of the piston.

2. A loading valve as set forth in claim 1 in which the stop pin has a clamping flange disposed nearer to one end of the pin than the other for selectively clamping the pin in place with either end projecting.

References Cited in the file of this patent
UNITED STATES PATENTS

| | | |
|---|---|---|
| 654,771 | Van Vechten | July 31, 1900 |
| 913,776 | Simons | Mar. 2, 1909 |
| 1,223,584 | Huebsch | Apr. 24, 1917 |
| 1,405,578 | Fish | Feb. 7, 1922 |
| 1,660,352 | Payne | Feb. 28, 1928 |
| 1,878,001 | Sloan | Sept. 20, 1932 |
| 2,271,047 | Sloan | Jan. 27, 1942 |
| 2,310,130 | Thumin | Feb. 2, 1943 |
| 2,319,069 | Krone | May 11, 1943 |
| 2,472,576 | Dobrick | June 7, 1949 |